United States Patent

[11] 3,627,859

[72] Inventors Edward C. Mesite
  Jenkintown, Pa.;
  Solomon Rosenblatt, Montclair, N.J.
[21] Appl. No. 850,339
[22] Filed Aug. 12, 1969
[45] Patented Dec. 14, 1971
[73] Assignee Leesona Corporation
  Warwick, R.I.
  Continuation of application Ser. No. 543,786, Apr. 20, 1966, now abandoned, Continuation-in-part of application Ser. No. 491,864, Sept. 30, 1965, now abandoned. This application Aug. 12, 1969, Ser. No. 850,339

[54] PROCESS FOR FORMING POROUS FLUOROCARBON POLYMER MATRICES
19 Claims, 1 Drawing Fig.

[52] U.S. Cl.................................................. 264/49,
  117/161, 136/146, 260/2.5, 264/127, 264/317
[51] Int. Cl...................................................... B29d 27/08

[50] Field of Search.......................................... 264/41, 49,
  44, 317, 127; 117/161 UH; 136/146; 260/2.5 M

[56] References Cited
UNITED STATES PATENTS

| | | | |
|---|---|---|---|
| 3,090,094 | 5/1963 | Schwartzwalder et al.... | 264/44 |
| 3,121,658 | 2/1964 | Orsino et al. ................ | 136/146 X |
| 3,497,256 | 2/1970 | Rosenblatt .................. | 264/41 |

Primary Examiner—Philip E. Anderson
Attorneys—Robert F. Conrad and Alfred W. Breiner

ABSTRACT: A method of preparing a porous hydrophobic polymeric matrix is described comprising precipitating a hydrophobic polymer onto loose fibers having a charge opposite to that of said polymer to form a polymer-fiber aggregate, shaping said aggregate, heating said shaped aggregate at an elevated temperature at which said precipitated polymer will sinter and said fibers consumed, and maintaining said aggregate at said elevated temperature for a time sufficient to sinter the polymer and consume the fibers, forming a pliable and coherent porous matrix.

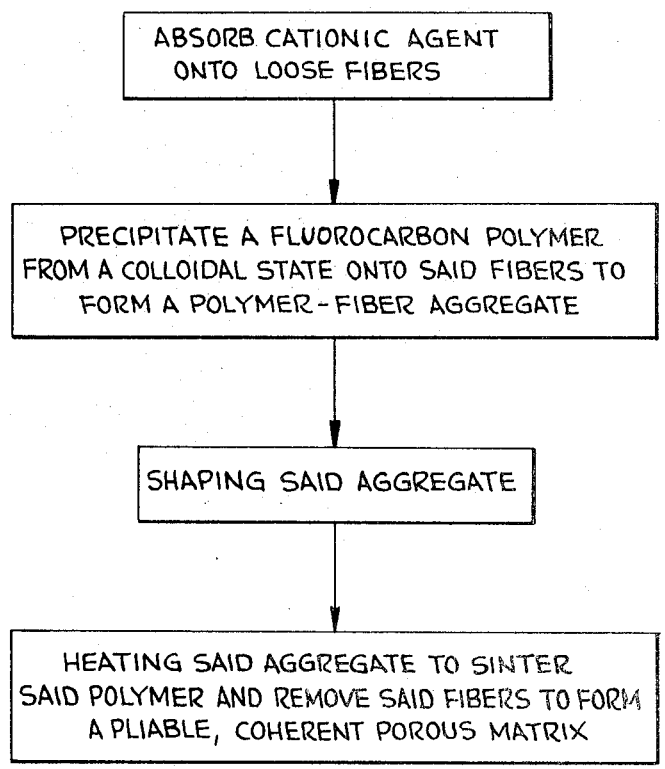

PROCESS FOR FORMING POROUS FLUOROCARBON POLYMER MATRICES

This application is a continuation of Ser. No. 543,786 filed Apr. 20, 1966 which in turn is a continuation-in-part of copending application Ser. No. 491,864 filed Sept. 30, 1965 by Solomon Rosenblatt, both now abandoned.

The present invention relates to the production of a porous hydrophobic matrix, having predetermined wetting characteristics, useful as filters, separators, diaphragms and the like. More particularly, the invention relates to the production of porous membranes or shaped articles of sinterable, corrosion and heat resistant fluoropolymers. The invention will be described hereinafter with particular reference being made to elements such as porous barriers, supports in electrode construction, or matrices for retaining an electrolyte for use in an electrochemical cell, and more particularly in a fuel cell. It is to be understood, however, that the materials of the invention have other utility where the peculiar characteristics of the composition are important as will be apparent to one skilled in the art. Reference to a fuel cell is by way of convenience and sets forth a preferred utility for the materials.

The principal requisites of a matrix or separator of the class useful in electrochemical cells are maximum chemical stability, low electrical resistance, and maximum diffusion of electrolyte in order to minimize the internal resistance of the overall assembly. Other necessary properties include sufficient mechanical strength to withstand handling during assembly of the cell, shape and dimensional stability when wet with electrolyte, controlled porosity and sufficient density to act as a physical barrier to resist penetration of the matrix by the gaseous reactants piercing the separator and possible short circuiting of the cell by metallic growths.

For optimum performance in a fuel cell employing a trapped aqueous electrolyte, the matrix should be wettable by the electrolyte to the extent that the electrolyte forms a continuous phase which is in intimate contact with one surface of each electrode. Moreover, the combination of matrix and electrolyte must act as an effective bubble barrier to avoid the mixing of reactant gases at one electrode surface to prevent reactions of an explosive nature. The electrolyte matrix must also have a porosity sufficient to permit the necessary ionic mobility requisite to the ionic conductance internal to the cell structure at minimum resistivity and be inert to the electrolyte impregnated therein. To avoid a current flow within the electrolyte system per se, with consequent wastage of utilizable power, the matrix must be an excellent electrical insulator. The matrix must also have a sufficient degree of pliability to conform to the surfaces of the electrodes of the cell so as to maintain the highest degree of area of contact therebetween and avoid areas of separation therefrom. Since the matrix must also function as a physical barrier to the mixing of the gaseous reactants, the matrix for a trapped electrolyte is ordinarily employed in fuel cell constructions wherein the matrix is compressed about the peripheral edges in sealing engagement with a suitable apertured framing member and/or cooperable sealing means or gasket. Therefore, the matrix preferably will have properties commendable to gasketing or sealing means. To minimize the cost the matrix should be constructed of materials which are readily available and manufactured by a quick, easy, efficient process, and the matrix preferably reutilizable by replenishing with fresh aqueous electrolyte.

Materials currently employed as matrices for trapped electrolyte systems include various materials such as modified cellulose and pressed mineral fibers such as asbestos, alumina, magnesia and the like. Such materials currently in use as matrix forming materials suffer from a number of serious drawbacks, the principal among them being lack of chemical and/or thermal stability and poor mechanical strength. By way of example, asbestos impregnated with an aqueous alkali such as potassium hydroxide is readily attacked to produce gelatinous residues which interfere with the ionic conductance, increase internal cell resistance and are incapable of being reimpregnated with fresh electrolyte. Modified cellulose, on the other hand, is easily hydrolyzed by the electrolyte.

The use of microporous polymeric films as elements in electrochemical cells, such as battery separators, is not new. For example, U.S. Pat. Nos. 2,542,527 and 2,676,929 disclose processes wherein polymeric materials such as polyvinyl chloride or polyethylene are admixed with finely ground starch particles and the mixture cast into sheets. The starch particles are hydrolyzed and rendered soluble by successive treatments and washing in both acid and alkaline media, leaving in their place voids of the approximate size of the original particles. While this type of microporous material has found some commercial application in the battery art, its principal disadvantages are the relatively high cost of manufacture, the difficulty experienced during manufacture in maintaining control of the pore size in the finished product, mechanical weakness of the resultant matrix, and the inability of the process to achieve pores with surfaces of controlled wetting characteristics, which are desirable in many fuel cell applications.

Accordingly, it is one object of the present invention to provide a method for fabricating a matrix free, or substantially free, of the defects associated with the aforementioned matrices of the prior art.

It is another object of the present invention to provide a method for producing matrices for trapped electrolytes, or as electrode supports for use in the fuel cell art permitting selective control of pore diameter, adjustability of dimensions, selection of degree and type of wettability and the desired surface texture.

It is another object of the present invention to provide a matrix in accordance with the foregoing objectives utilizing a polyfluoroethylene polymer.

The foregoing objectives, as well as additional objectives, advantages and features realizable from the present invention will be more clearly seen from the following description with particular emphasis being placed on the working examples.

In accordance with the present invention, a porous fluoropolymer matrix is made by precipitating the polymer from a colloidal state onto a loose slurry of selected and oppositely charged fibers, such as cellulose fibers. The charge on the fibers is induced by the adsorption of cationic agents on their surface. The fiber/polymer ratio and the diameter of the fiber determines porosity and pore size respectively. The plastic coated coagulum is extracted from the slurry and dried. The fibers may be either reslurried in water and redeposited upon a paper mat by processes known to the art or compressed into a sheet in a suitable mold. The dried sheet or mat is placed in a furnace adjusted to the sintering temperature of the hydrophobic polymer, causing the fibers to burn out, leaving a porous plastic structure behind. The drawing is a flow diagram illustrating the various steps of an embodiment of the invention.

Varying wetting characteristics and pore surface texture can be produced according to the present invention by adsorbing a colloidal mineral of desired dimensions onto the surface of the fiber in an aqueous medium and precipitating the finely divided particulate fluoropolymer from an aqueous dispersion onto the mineral modified surface of the fiber, and collecting the resulting coagulum. The coagulum can be formed into any desired shape, which is then subjected to elevated temperatures sufficient to cause the particular hydrophobic polymer to sinter to a pliable coherent mass and to cause the fibrous substrate to undergo combustion, forming a combustion product, exposing the volume previously occupied by the fibrous substrate, and leaving the colloidal mineral distributed uniformly throughout the pore structure and firmly held therein. In an electrolyte matrix the mineral additives, or fillers, act as "stepping stones," allowing the "electrolyte" to achieve ionic conductive continuity between the electrodes as a result of their particular wetting characteristics. Any carbonaceous residue in the structure can be removed by treating the sintered material with a strong oxidizing acid, such as nitric acid, prior to the final drying. The resulting composition has a pore surface texture and chemical composition which is readily wettable by an aqueous electrolyte. The electrical resistivity of the porous material when used as a matrix for a trapped electrolyte, or as a support for an electrode, is materially reduced and the ionic conductivity enhanced to a high degree.

In practicing the present invention, a staple cellulosic, or similar fiber of the desired dimensions can be suspended in an aqueous medium by such conventional methods as the action caused by a plurality of blades rotating at high speeds to produce a severing action upon the fibrous material, and thereby causing the formation of a pulp or suspension of fibers corresponding to the desired dimensions of the ultimate pore structure of the matrix. A colloidal mineral can be added to the resulting suspension and caused to sorb upon the surface thereof by the addition of cationic agents or like means. The particulate hydrophobic polymer is precipitated from a colloidal state into a loose slurry of the fibers, or the polymer is added to the aqueous dispersion of fibers, and a coagulating or flocculating agent added to cause coagulation or precipitation to form a polymer/fiber coagulum, or a polymer/colloidal mineral/fiber coagulum or aggregate.

The coagulum is capable of separation and extrusion by conventional processes to form articles of any desired shape suitable for the ultimate purposes intended. The shaped article is subjected to temperatures sufficient to cause sintering of the particulate polymer and formation of a coherent pliable mass having a porosity controlled by the amount of cellulosic fibers therein through combustion of the fibers forming a carbonaceous combustion product, thereby exposing the volume previously occupied by the cellulosic fiber.

The preliminary coalescence of the polymer/fiber, or polymer/colloidal mineral/fiber aggregate to form the sinterable stock of the present invention is accomplished by an organic coalescing or flocculating agent which is mixable with water and in which the polymeric material is substantially insoluble. Exemplary flocculating or coalescing agents include acetone, methyl ethyl ketone, methanol, ethanol and like compounds. The sinterable stock from the initial coalescing can be formed into membranes or other desired shapes through conventional extrusion or orifices extrusion slots or by resuspension in an aqueous medium and collection by mechanical means, such as forced filtration of the aqueous phase and the like.

Complete coalescence of the polymer particles to form a continuous polymeric phase in the formation of the porous article is achieved by sintering. Development of optimum mechanical properties is dependent in part upon the ratios of polymer:mineral:fibrous substrate as well as in part upon the sintering conditions, since incomplete sintering results in weak spots and corresponding poor mechanical properties. The optimum sintering temperature appears to be approximately 350°–400° C. although temperatures as high as 430° C. can be successfully employed with some fluoropolymers such as polytetrafluoroethylene. In general, sintering is effected at a temperature between the crystalline melt point, e.g., in the case of polytetrafluoroethylene, 327° C., and the decomposition temperature of the hydrophobic polymer. While higher temperatures in general require shorter sintering times, temperatures in excess of 400° C., e.g. in the case of polytetrafluoroethylene, tend to promote appreciable degradation. Any suitable heating media such as the hot air of a muffled furnace, radiant heat, heated rollers or platens and the like may be employed in the sintering operation.

Although particular reference has been made hereinbefore to polytetrafluoroethylene, which is the preferred polymer in the practice of the present invention, other polyhalogenated polymers can be used. By way of example copolymers of tetrafluoroethylene with other unsaturated organic compounds such as perfluoropropylene, chlorotrifluoroethylene and the like may be employed provided such copolymers maintain the essential properties of the tetrafluoroethylene homopolymer. In general, copolymerizable modifiers may be present in an amount up to about 15 percent by weight of the copolymer without destroying or deviating from the advantageous properties of the tetrafluoroethylene. Other plastics usable herein are polymers of fluorinated propylene, vinylfluoride, vinylidene fluoride, and copolymers thereof.

The production of the fluoropolymer dispersion is not a part of the present invention. The dispersion may be prepared by any suitable process described in the existing art including, by way of example, procedures disclosed in U.S. Pat. No. 2,478,229; U.S. Pat. No. 2,534,058; U.S. Pat. No. 2,559,750; and U.S. Pat. No. 2,685,707. The particle size of the polymer in the dispersions employable in the practice of the present invention may vary over a wide range. Preferably, the particles of the polymer should be of a colloidal state, e.g., a practical size range being from 0.05 to about 5 microns and more preferably, from about 0.1 to about 3 microns in size. The smaller the particles the more easily is the formation of the sinterable stock and the workup of the sinterable stock to the ultimate, porous shaped structure. The fluoro polymer can vary widely as to molecular weight. Advantageously, weights for the fluoro polymer of 8,000 or higher are employed. As employed herein the term "hydrophobic polymer" or fluoro polymer refers to polymers such as, e.g., polytetrafluoroethylene and the like, noted above, which have crystalline melt temperatures above about 300° C. and are sinterable at temperatures from around their crystalline melt temperature to the decomposition temperature of the respective polymer. Suitable starting materials of this type include aqueous suspensions containing 60 percent by weight of polytetrafluoroethylene particles, available under the trade names Teflon 30, Teflon 41X and the like. Such dispersions may contain compatible wetting agents which may be of cationic, nonionic and anionic types. Where the polymeric dispersion contains such wetting or stabilizing agents, precipitation of the particulate polymer onto the surfaces of the cellulosic fibrous substrate or colloidal mineral modified cellulosic fibrous substrate is facilitated by use of precipitating agents inducing the opposite charge upon the substrate particles.

The fibrous pore forming substrate can be formed by any conventional mechanical and/or chemical pulp forming procedure employed in the paper making or like art. The fibrous pulp can be prepared from flax, cereal straws, wood products and like cellulosic pulp rendering starting materials. The degradation by mechanical and/or chemical means is continued until a fibrous pulp suspension is obtained having the requisite dimensional parameters. As the size of the pore structure in the ultimate sintered composition corresponds closely to the dimension of the volume occupied by the fibrous substrate prior to combustion thereof to form the gaseous product which exposes the volume to ambient, the dimension of the fibrous substrate employed in compounding the sinterable stock will depend upon the use and characteristics desired of the ultimate porous membrane composition. By way of example, in the use of the sinterable stock to form a porous wettable membrane matrix for trapped electrolytes in gas consuming fuel cells, a fibrous suspension wherein the individual fibers have an average cross section of from about 0.5 to about 20 microns and more advantageously from about 1 to about 5 microns is preferred. For other uses such as battery diaphragms, electrode supports and the like, the fibers can have an average diameter of from about 0.5 to about 200 microns. The length of the fiber can vary, again being determined by their ultimate use. In general fibers having an average length of from about 5 microns to about 10 millimeters can be employed.

In a preferred embodiment of the invention, colloidal mineral components increasing the wettability of the hydrophobic fluoro plastics are incorporated into the pore structure of the matrix by sorbing suitable colloidal minerals on fibrous cellulose prior to the deposition of the colloidal hydrophobic polymer to form the coagulum or aggregate. When the final structure is subjected to the sintering temperatures of the fluoropolymer the cellulosic material burns out leaving the wettable filler deposited in the pore structure previously occupied by the cellulosic material and now exposed to ambient by the decomposition gases. The resulting structure is characterized by good mechanical strength, high porosity, selective wetting characteristics and excellent stability to chemical attack by the electrolytes. The chemically stable aqueous wettable fillers function as "stepping stones" to permit the electrolyte to achieve a phase continuity over the surfaces defining the pores of the porous matrix between the electrodes. For optimum capillary requirements the chemically stable wettable fillers should preferably have a particle size in the 0.01 to 0.2 micron range. Exemplary wettable fillers for filling the aforesaid capillary requirements include potassium-titanate, titanium dioxide, thoria, zirconia and the like. The aforesaid wettable fillers may be in fibrous or powder form.

Having described the invention in general terms, to more particularly illustrate the invention a detailed working example will be set forth.

EXAMPLE

Twelve grams of ashless filter paper (no. 41 Watman), 250cc.'s of distilled water, and one cc. of a 10 percent aqueous solution of pelargonate quaternary amine hydrochloride, and 6 grams of colloidal silica, are charged to a Waring type blender and mixed for 15 minutes at approximately three-quarters the rated capacity of the blender. Sixty grams of a 50 percent by volume aqueous dispersion of polytetrafluoroethylene, stabilized with a nonionic surfactant, is added to 100cc.'s of distilled water and the mixture charged to the blender while the blender is turned on at 30 percent of the maximum speed. After all the dispersion has been added, the resultant charge is agitated for an additional 15 minutes. Thereafter, with the mixture subjected to a constant speed, approximately 30 percent of the maximum blender speed, 150cc.'s of acetone is added and the mixture stirred for an additional 5 minutes.

The coagulated slurry is collected by filtration in a vacuum funnel and the resultant cake dried at 100° C. at 25 inches of vacuum for 16 hours. The resultant dried cake is broken up in the blender until a loose, fluffy, fibrous product is obtained. Three grams of the resultant loose fibers and 150cc.'s of distilled water are mixed in the blender at high speed for 1 minute. Trapped air is removed in a vacuum assembly. A 9 centimeter filter paper is placed on a vacuum funnel and the slurry deposited thereon. The slurry is allowed to settle slowly in the absence of a vacuum for approximately 2 minutes and a vacuum then applied until water is no longer extractable. The upper surface can be rendered more even by pressing down upon the mat with a filter paper of the same size as below. The resulting slurried cake is dried overnight at 150° F. The filter papers are removed and the mat placed in a muffle furnace at 670° F. for 15 minutes, or until all the cellulose is burned out. The mat is allowed to cool slowly at room temperature and the resultant porous plastic sheet is placed in a hot nitric acid reflux assembly and boiled until the plastic achieves its characteristic off-white color. The matrix as prepared above has excellent utility in a fuel cell for retaining an aqueous electrolyte, or as a support in electrode construction. In the electrode construction, one surface of a thin sheet of the matrix is coated with an activating material such as platinum black and the polytetrafluoroethylene surface maintained in contact with the fuel gas, with the activated surface being in contact with the electrolyte.

Additionally, in example 1, prior to the addition of the polymer dispersion, chemically stable wettable fillers such as potassium-titanate, titanium dioxide, thoria, zirconia, either in powder or fiber form, can be added to the fibrous suspension. The resultant product will be similar to the product obtained in the example except that the inert filler will be present at the porous openings of the plastic matrix. This expediency permits the tailor-making of the matrix as to surface properties, such as wetting and the like.

Although the present invention has been described with emphasis being placed upon fuel cell applications, it is apparent, as noted in the preamble of the specification, that the described structures will have numerous applications as filters, diaphragms and the like. The hydrophobic polymer structures can be made having varying porosities and pore sizes, including membranes where the actual porosity is not discernible, i.e., where it is doubtful whether the pores are in the submicron range or are present as simple spaces between molecular chains. Since the pore size can be accurately determined, and because of the chemical inertness and heat resistant properties of the matrices, they can be used in numerous applications which will be apparent to one skilled in the art. Furthermore, according to the present invention it is possible to construct the novel matrix around a support such as a metal screen to improve its mechanical stability and render the matrix electrically conductive. The various modifications of the matrices and their numerous applications are to be included herein, with the invention only being limited by the appended claims.

It is claimed:

1. A method for preparing a porous hydrophobic matrix having preselected wetting characteristics, which method comprises the steps of precipitating a fluorocarbon polymer onto loose fibers of preselected average size and having a charge opposite to that of said polymer to form a polymeric-fiber aggregate, said fibers comprised of a first component gasifiable at the temperature at which said precipitated polymer sinters and a second component which is nongasifiable at the aforesaid sintering temperature and which is wettable by aqueous electrolyte, forming said aggregate into a desired shape, maintaining the aforesaid aggregate at a temperature sufficient to cause said precipitated polymer to sinter and form a pliable coherent mass and to gasify said gasifiable component.

2. The method according to claim 1 wherein said gasifiable component is a cellulosic material, said nongasifiable aqueous wettable component is a finely divided particulate mineral and said fluorocarbon polymer is polytetrafluoroethylene.

3. The method according to claim 2 wherein said nongasifiable wettable component is a mineral and has a particle size from about 0.1 to about 0.2 microns.

4. A method for preparing a porous hydrophobic polymeric matrix having preselected wettable characteristics, which method comprises the steps of absorbing a cationic agent onto the surface of loose cellulosic fibers of preselected dimensions, precipitating a hydrophobic polymer from a colloidal state onto the oppositely charged cellulosic fibers to form a polymer-fiber aggregate, forming said aggregate into a desired shape, subjecting said aggregate to a temperature sufficient to cause said polymer to sinter and form a pliable coherent mass and to cause said cellulosic fibers to oxidize to a carbonaceous gaseous product.

5. The process according to claim 4 wherein the cellulosic fibers have an average cross section of 0.5 to 20 microns and an average length from about 5 microns to 10 millimeters.

6. A method for preparing a porous hydrophobic polymeric matrix having preselected wettable characteristics which method comprises forming an aqueous slurry of loose cellulosic fibers of preselected average dimensions, absorbing a cationic agent on said cellulosic fibers, precipitating an electrolyte stable wettable mineral in a finely divided particulate state onto said cellulosic fibers, precipitating a hydrophobic polymer in a colloidal state onto the fibers to form a polymer-fiber aggregate, forming said aggregate into a desired shape, subjecting said aggregate to a temperature sufficient to cause said polymer to sinter and form a coherent mass and consuming said cellulosic fibers.

7. The process according to claim 6 wherein the ratio of polymer to cellulosic fibers is from about 0.1 to 10.0 on a weight basis.

8. The method according to claim 7 wherein the electrolyte stable wettable mineral has a particle size of from about 0.1 to about 0.2 microns.

9. The method according to claim 8 wherein said mineral is selected from the group consisting of potassium titanate, titanium dioxide, thoria, zirconia.

10. The process according to claim 9 wherein said hydrophobic polymer is polytetrafluoroethylene.

11. A method for preparing a hydrophobic polymeric matrix which comprises suspending pore forming loose cellulosic fibers having dimensions corresponding to the size and shape of the desired pore structure of the completed matrix in an aqueous medium, adding a cationic agent, adding an aqueous dispersion of finely divided hydrophobic polymer, precipitating the colloidal hydrophobic polymer onto the cellulosic fibers, separating the resulting polymeric coated cellulosic aggregate and forming the separated coagulum into a matrix of desired shape, and subjecting the molded matrix to elevated temperatures sufficient to cause the hydrophobic polymer to sinter and form a pliable coherent mass and to cause the combustion of and removal of the cellulosic fibers whereby there is formed a continuous porous matrix.

12. The method according to claim 11 wherein the hydrophobic polymer is polytetrafluoroethylene.

13. A method for preparing a hydrophobic polymeric matrix having preselected wettable characteristics which method comprises the steps of suspending a cellulosic material of haphazard fibrous arrangement in an aqueous medium, subjecting said mixture to mechanical agitation of sufficient speed to sever said fibrous material and form a suspension of fibrous materials having average dimension and shape corresponding to the shape of the desired pore structure, adding a mineral filler having a particle size of from about 0.1 to about 0.2 microns, adding a cationic agent in an amount sufficient to cause said colloidal mineral to be sorbed upon the surface of said cellulosic fibrous substrate, adding a suspension of finely divided hydrophobic polymeric particles to the aforesaid mixture and precipitating said hydrophobic polymeric particles onto the cellulosic material upon which said colloidal mineral filler is absorbed, separating the resulting hydrophobic polymeric, colloidal mineral, cellulosic aggregate and forming the same into a matrix of desired shape, and subjecting the resulting coagulum to elevated temperatures sufficient to cause the hydrophobic polymeric material to sinter and to combust the cellulosic substrate to a carbon containing gaseous state to form a pliable coherent matrix, having integrally connected interconnecting pores with the wettable mineral component deposed within said pore structure.

14. A method of producing a sinterable stock for the production of porous articles of a fluorocarbon polymer having predetermined wettable characteristics, comprising forming an aqueous suspension of individual staple fibers combustible at the sintering temperature of the fluorocarbon polymer and a chemically staple, wettable mineral filler, adding a cationic agent in an amount sufficient to cause the colloidal mineral to be sorbed onto the staple fibrous substrate, adding an anionic stabilized aqueous dispersion of finely divided particulate fluorocarbon polymer, and precipitating said finely divided particulate fluorocarbon polymer onto the surface of said staple fiber to form a coagulum.

15. A method for preparing a porous hydrophobic polymeric matrix having preselected wettable characteristics, which method comprises the steps of absorbing a cationic agent onto the surfaces of loose fibers of preselected dimensions, precipitating a fluorocarbon polymer from a colloidal state onto the loose fibers to form a polymer-fiber aggregate, shaping said aggregate, subjecting said shaped aggregate to a temperature sufficient to cause said polymer to sinter and said fibers to be consumed to form a pliable, coherent porous matrix.

16. The method of claim 15 wherein said loose fibers are of a cellulosic material.

17. The method of claim 16 wherein the fluorocarbon polymer is polytetrafluoroethylene.

18. A method for preparing a hydrophobic polymeric matrix having preselected wettable characteristics, which method comprises the steps of precipitating a fluorocarbon polymer onto loose fibers having a charge opposite to that of said polymer to form a polymer-fiber aggregate, shaping said aggregate, heating said shaped aggregate to a temperature at which said precipitated polymer will sinter and said fibers be consumed, maintaining said aggregate at said temperature for a time sufficient to cause said polymer to sinter and said fibers to be consumed and to form a pliable and coherent porous matrix.

19. The method of claim 4 wherein the hydrophobic polymer is polytetrafluoroethylene.

* * * * *